(12) United States Patent
Saund

(10) Patent No.: US 6,517,266 B2
(45) Date of Patent: Feb. 11, 2003

(54) SYSTEMS AND METHODS FOR HAND-HELD PRINTING ON A SURFACE OR MEDIUM

(75) Inventor: Eric Saund, San Carlos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/854,592

(22) Filed: May 15, 2001

(65) Prior Publication Data

US 2002/0171731 A1 Nov. 21, 2002

(51) Int. Cl.[7] ................. B41J 3/39; B41J 3/36
(52) U.S. Cl. ............... 400/88; 400/61; 400/70; 400/76; 347/109
(58) Field of Search .............. 400/88, 76, 70, 400/61; 347/109

(56) References Cited

U.S. PATENT DOCUMENTS

| | | | |
|---|---|---|---|
| 4,814,552 A | | 3/1989 | Stefik et al. |
| 5,585,605 A | | 12/1996 | Williams et al. |
| 5,825,995 A | * | 10/1998 | Wiklof et al. ............ 358/1.18 |
| 5,829,893 A | * | 11/1998 | Kinoshita et al. ........... 347/109 |
| 5,927,872 A | * | 7/1999 | Yamada ..................... 400/88 |
| 5,939,703 A | | 8/1999 | Hecht et al. |
| 6,000,946 A | * | 12/1999 | Snyders et al. ............ 434/107 |
| 6,202,096 B1 | * | 3/2001 | Williams et al. ........... 709/227 |
| 6,229,565 B1 | * | 5/2001 | Bobry ..................... 348/207.99 |
| 6,318,825 B1 | * | 11/2001 | Carau, Sr. .................... 347/2 |
| 6,357,939 B1 | * | 3/2002 | Baron ....................... 400/61 |
| 6,368,002 B1 | * | 4/2002 | Saund et al. ................ 33/1 M |

FOREIGN PATENT DOCUMENTS

| | | | | |
|---|---|---|---|---|
| JP | | 61029563 A | * 2/1986 | ............ B41J/3/28 |

OTHER PUBLICATIONS

*The XVision System: A General–Purpose Substrate for Portable Real–Time Vision Applications*, Gregory D. Hager et al. Computer Vision and Image Understanding 69 (1) pp. 23–37.

* cited by examiner

Primary Examiner—Charles H. Nolan, Jr.
(74) Attorney, Agent, or Firm—Oliff & Berridge, PLC

(57) ABSTRACT

A hand-held printer system is designed for printing a stored image onto a surface or other media. In particular, various embodiments are adapted for hand-held printing onto the surface of a whiteboard. In embodiments, the printer system comprises a marking mechanism including at least one print head, a global position sensing system that senses a position of the at least one print head, and a control mechanism that actuates the at least one print head based on the sensed position. In other embodiments, the system comprises a local position sensing system that senses a position of the at least one print head relative to a drawing surface.

29 Claims, 7 Drawing Sheets

US 6,517,266 B2

SYSTEMS AND METHODS FOR HAND-HELD PRINTING ON A SURFACE OR MEDIUM

BACKGROUND OF THE INVENTION

1. Field of the Invention

The present invention relates to systems and methods for handed-held printing a stored image on a surface or medium.

2. Description of Related Art

Electronic document technology has been developed to support two directions of information flow, i.e., image capture and image display. Image display generally involves printing a stored image on a desired surface or medium, or displaying the stored image on a display device, such as a monitor or projection screen.

For printing a stored image on a desired medium such as paper, a desktop printer or portable printer is typically employed. In such devices, the medium is fed past a ink-jet head, laser or other printing mechanism within the device so that image data is reproduced on the medium. Thus, even though printers may be portable, such devices are not suitable for printing on surfaces that cannot be fed through the device.

A hand-held printer is disclosed in U.S. Pat. No. 5,927,872 to Yamada. This printer has optical sensors for tracking positions of the hand-held printer relative to the surface of a print medium during a printing process. The change in position of the hand-held printer during the printing process is monitored in real time using navigation information generated by the optical sensors. Images of the surface of the print medium are captured at fixed time intervals. The optical sensors may detect printed features or slight pattern variations on the print medium, such as papers fibers or illumination patterns from reflective features and shadowed areas between raised features. Such features are used as references for determining the movement of the hand-held printer.

SUMMARY OF THE INVENTION

This invention provides systems and methods for hand-held printing a stored image on a surface or medium.

This invention separately provides systems and methods for hand-held printing using an absolute coordinate system.

This invention separately provides systems and methods for hand-held printing using global tracking or position information.

This invention separately provides systems and methods for hand-held printing using a combination of global and local tracking or position information.

This invention separately provides systems and methods for hand-held printing with a relatively low-tech appearance and operation.

This invention separately provides systems and methods for hand-held printing of a stored image onto a whiteboard.

This invention separately provides systems and methods for an interface between electronic and/or computer technology and conventional whiteboard technology.

This invention separately provides systems and methods for hand-held printing of a stored image using dry-erase ink.

This invention separately provides systems and methods for hand-held printing of a stored image based on image data and position information.

In various exemplary embodiments of the systems and methods of this invention, a printer system comprises a hand-held device usable to print images onto a surface or medium. Global position information of the hand-held device relative to the surface or medium is detected and used to determine a portion of the image that is printed on the surface or medium.

In various exemplary embodiments the systems and methods of this invention, an image is stored as pixel data. As a user moves a hand-held marking mechanism of a printer system across a surface, global position sensing technology is used to sense where the marking mechanism is located on the surface. The position of the marking mechanism is compared with the pixel data of the stored image, and ink is printed onto the surface to reproduce the stored image.

In various exemplary embodiments, an inkjet-style print bar is used. The print bar may contain a row of ink nozzles that each eject ink under computer control. The hand-held device may print an image in conventional dry-erase ink and may be used to print on a conventional whiteboard.

In various exemplary embodiments of the systems and methods of this invention, a marking mechanism is moved over a surface or medium. A global position of the marking mechanism relative to the surface or medium is sensed as the marking mechanism changes location. A control signal is transmitted to the marking mechanism based on image data of a stored image and the sensed position. The control signal causes the marking mechanism to print the stored image onto the surface or medium.

In various exemplary embodiments of the systems and methods of this invention, a local position sensing system senses a motion of the at least one print head relative to the surface or medium. The local position sensing system may comprise a video-based system including a plurality of glyph marks on the surface or medium and at least one video camera associated with the at least one print head.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention described in detail below, with reference to the attached drawing figures, in which.

DETAILED DESCRIPTION OF EXEMPLARY EMBODIMENTS

For ease of understanding, the systems and methods of this invention will be described below with reference to an embodiment that is adapted for printing onto a surface of a whiteboard. It should be understood, however, that the systems and methods of this invention may be applied to a wide variety of surfaces and media other than the specific embodiment of a whiteboard-based system. Thus, the details and particular configuration may be adapted to a particular application by those skilled in the art based upon this disclosure.

In various exemplary embodiments of the systems and methods of this invention, a whiteboard printing system comprises a marking mechanism that is moved over a surface of a whiteboard. A position sensing system senses a position of the marking mechanism relative to the whiteboard as the marking mechanism changes position. A control mechanism is used to actuate the marking mechanism.

A stored image comprising image data is stored in a storage device. An image data signal is generated by the control mechanism for the image data based on the sensed position of the marking mechanism. The sensed position is supplied to the control mechanism and the image data signal is supplied to the marking mechanism by a communication system based on the image stored in the storage device. The marking mechanism is thus actuated by the control mechanism based on the image data signal so that the stored image is printed onto the whiteboard.

In various exemplary embodiments, the marking mechanism comprises a print head having a linear array of ink nozzles similar to those used in commercial inkjet printers. Although an existing ink-jet print head may suffice, the requirements of the whiteboard printer systems and methods are somewhat different from ink-jet printers designed to print on a medium such as paper. For example, in the systems and methods according to this invention, the print head must be designed to work with a form of dry-erase ink, and the print resolution need only be approximately 30 spots/inch instead of the 300 spots/inch required of standard ink-jet printers.

In various exemplary embodiments, the position of the marking mechanism and/or the print head on the whiteboard is determined in real time as the user performs a swipe. Various technologies may be employed to accomplish position sensing as further described below.

Figure 1:
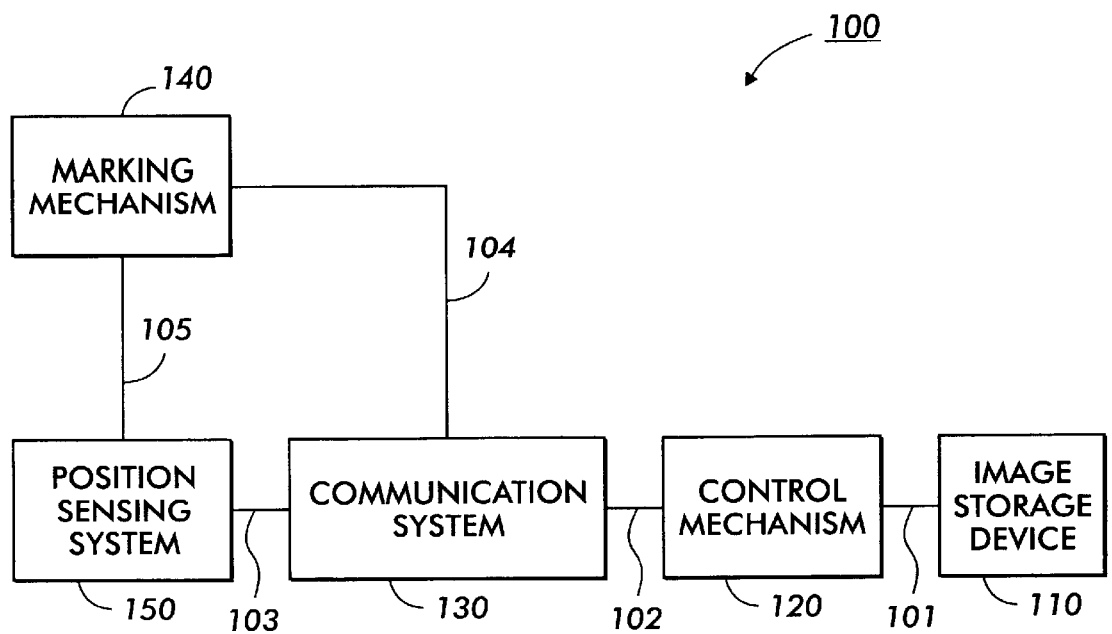
FIG. 1 is a block diagram representing an exemplary embodiment of a whiteboard printer system according to this invention.

FIG. 1 shows a block diagram representing an exemplary embodiment of a whiteboard printer system 100 according to this invention. In this embodiment, the whiteboard printer system 100 may be used with a conventional whiteboard (not shown). As shown, the whiteboard printer system 100 includes an image storage device 110, a control mechanism 120, a communication system 130, a marking mechanism 140 and a position sensing system 150. It should be understood that, while these elements are represented separately in the block diagram of FIG. 1, these elements are not necessarily separate and distinct components.

Image data of an image is stored by the image storage device 110. The image storage device 110 may be any suitable device, either known or hereafter developed, that is capable of at least temporarily storing image data in any known or later developed format. For example, the image storage device 110 may be a hard disk drive, a floppy disk or computer memory on/in which image data such as a portable digital document (PDD) may be stored in various formats, such as portable document format (PDF), or any known or later developed page-description language (PDL), graphics interchange format (GIF), joint photographic experts group format (JPEG), or JPEG file interchange format (JFIF).

The marking mechanism 140 may be any suitable device, either known or hereafter developed, that is capable of reproducing the image or producing a representation of the image on the surface of the whiteboard. In various exemplary embodiments of this invention, the marking mechanism 140 comprises a print head, such as an ink-jet print head. Further, since the systems and methods of this invention are also applicable to printing on surfaces or media other than whiteboards, the marking mechanism generally may be any suitable device, either known or hereafter developed, that is capable of reproducing the image or producing a representation of the image on a desired surface.

The position sensing system 150 may comprise any suitable device or arrangement of devices, either known or hereafter developed, that is capable of determining a position of the marking mechanism 140 relative to the whiteboard, or other desired surface, as the marking mechanism 140 is moved across the surface of the whiteboard, or other surface. In other words, the position sensing system 150 determines the location of the marking mechanism 140 on the surface of the whiteboard, or other surface, and tracks the marking mechanism 140 as it moves. Examples of suitable arrangements for the position sensing system 150 are described further below.

The control mechanism 120 may be any device or software structure that is capable of accessing the image data from the image storage device 110 and providing instructions to the marking mechanism 140 to reproduce the image, or at least a representation of the image. As described further below, the control mechanism 120 uses position information from the position sensing system 150 to determine the portion of the image data that is to be reproduced/represented on each corresponding portion of the whiteboard surface. The control mechanism 120 thus provides instructions to actuate the marking mechanism 140 appropriately as the marking mechanism 140 is moved over the surface of the whiteboard.

As shown in FIG. 1, the image storage device 110, the control mechanism 120, the communication system 130, the marking mechanism 140 and the position sensing system 150 are interconnected by links 101, 102, 103, 104 and 105. The links 101–105 can be wired or wireless links or any other known or later developed element or elements that are capable of supplying electronic data to and from the connected elements 110–150.

The communication system 130 may comprise any suitable device or arrangement of devices, either known or hereafter developed, that is capable of supplying electronic data from the position sensing system 150 to the control mechanism 120 and from the control mechanism 120 to the marking mechanism 140. For example, the communication system 130 may comprise a distributed network, such as an intranet, an extranet, a local area network, a metropolitan area network, a wide area network, a satellite communication network, an infrared communication network, the Internet, the World Wide Web, or any other known or later developed distributed network. The communication system 130 may also comprise wired or wireless links.

The control mechanism 120 may be operated by any suitable method either known or hereafter developed. For example, the method illustrated in the exemplary flowchart of FIG. 2 may be used to operate the control mechanism 120 so that each element of the marking mechanism 140 is actuated as required to print the stored image.

Figure 2:
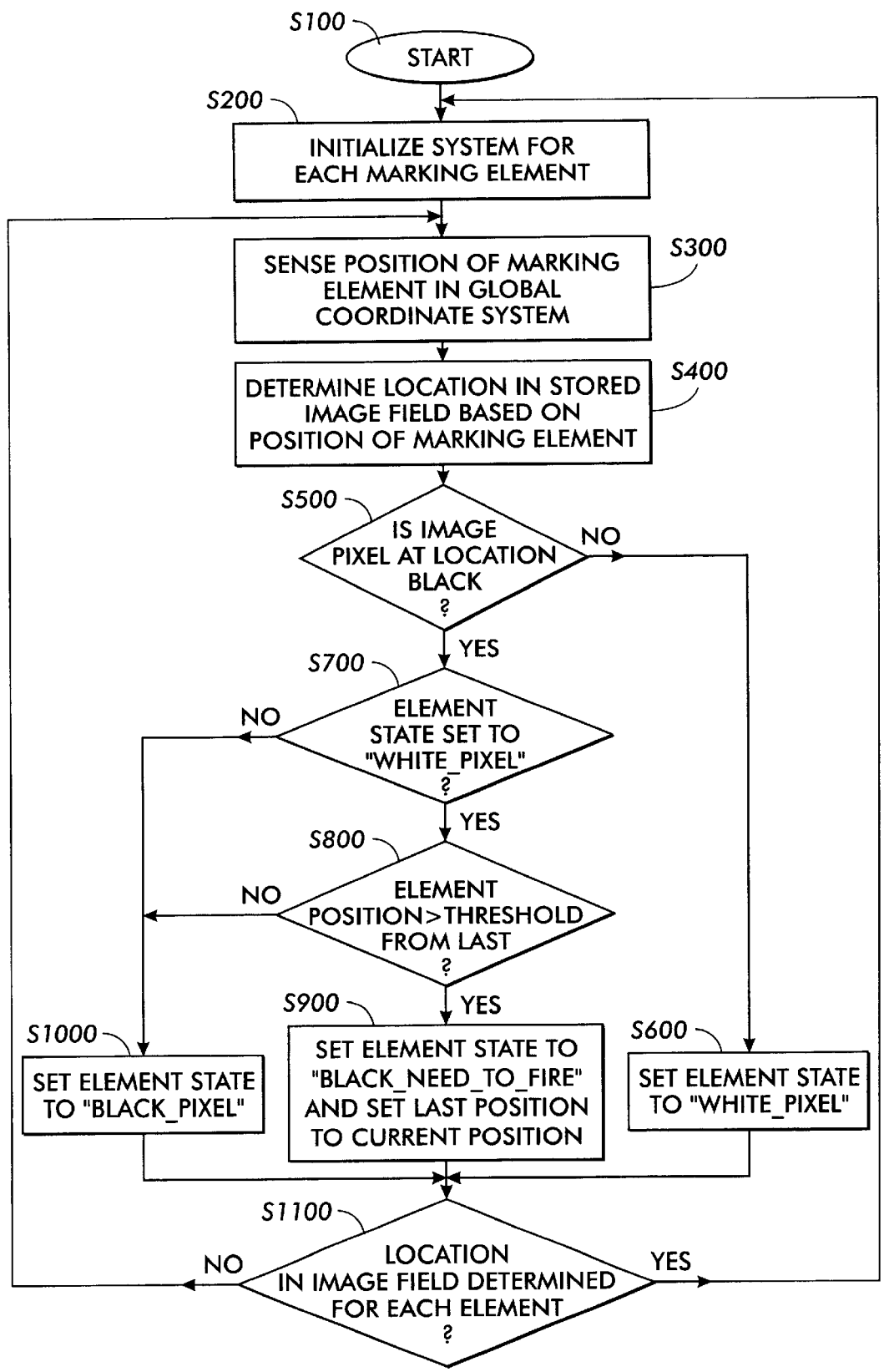
FIG. 2 is a flowchart of one exemplary embodiment of a method for controlling the control mechanism according to this invention.

As shown in FIG. 2, the method begins in step S100, and continues to step S200, where the starting location, orientation and length of the marking mechanism 140 are initialized in a global coordinate system using fixed units having given origin and axes with respect to the stored image. For example, the global coordinate system may be conveniently defined to be measured in inches, originating at an upper left corner of the stored image, with the x axis extending horizontally to the right across top edge of the stored image, and the y axis extending vertically downward along the left edge of the stored image. For many applications, the initial location of the marking mechanism 140 will be along the y axis. Since this invention employs global position sensing, the marking mechanism 140 may assume any starting location. Preferably, the initial location of the marking mechanism 140 will be "off" of the image, so that each marking element state is initialized to "white_pixel" (no printing) and each marking element last location is initialized to "off_the_image".

Next, in step S300, the motion of the marking mechanism 140 is tracked as the marking mechanism 140 is moved over the surface of the whiteboard. For example, if the position sensing system 150 estimates the absolute x-y position of a pair of sensors relative to the initial location of the sensors, measurements can be referred to as "top_x, top_y" and "bottom_x, bottom_y". The absolute x-y position is thus expressed in the global coordinate system. If sensors of the position sensing system 150 provide velocity information about the marking mechanism 140, then absolute position estimates can be obtained by numerical integration.

In the exemplary embodiment of the method shown in FIG. 2, three arrays are maintained, for example, in electronic memory. Each array may contain one entry for each marking element of the marking mechanism 140, indexed sequentially from one end. One array is a current-state-array, where each entry has a white-pixel, black-pixel-need-to-fire, or black-pixel value. The other two arrays are a last-fired-x-array and a last-fired-y-array, where each entry has a floating value in the global coordinate system. Then in step S400, a coordinate transform is performed to determine the location of the marking mechanism 140 in a stored image field pixel coordinate system based on the position of a given marking element of the marking mechanism 140 in the global coordinate system. Control then proceeds to step S500. In step S500, a determination is made whether a pixel at that location in the stored image is black. If not, control continues to step S600. Otherwise, control jumps to step S700. In step S600, the marking element state is set to "white_pixel". Control then jumps to step S100. In contrast, in step S700, a determination is made whether the marking element state is set to "white_pixel". If so, control proceeds to step S800. Otherwise, control jumps to step S1000. In step S800, a determination is made whether the current location of the marking element is greater than a threshold distance from the location at which the marking element was last located.

If the current location of the marking element is greater than a threshold distance from the location at which the marking element was last located, control continues to step S900. Otherwise control again jumps to step S1000. In step S900, the marking element state is set to "black_need_to_fire" and the last location of the element is set to the current location of the marking element. Control then jumps to step S1100.

In contrast, in step S1000, the marking element state is set to "black_pixel". Control then continues to step S1100. In step S1100, a determination is made whether the coordinate transform has been applied to all of the marking elements. If so, control returns to step S200. If not, control returns to step S300.

It should be understood that various other embodiments of the method for operating the control mechanism 120 may be used. For example, the method used to vary the duration of activation of each marking element based on the velocity of the marking mechanism 140 and the position of a black/white image boundary along the marking element's trajectory or may alter the order or timing at which the last-fired values are set.

The strategy of the method is to look up the desired pixel in the stored image for each location of each marking element to determine if the individual marking elements are to be actuated to eject ink or otherwise mark the surface. Each time a marking element is actuated, the position of that marking element in the global coordinate system is stored. A marking element is not actuated if its current location is within a preset threshold distance from the location at which it was previously actuated, i.e., the stored position. This strategy leads to relatively uniform ink application regardless of the velocity or trajectory of the marking mechanism 140, up to a maximum velocity depending on the cycle time required to address each of the marking elements.

Figure 3:
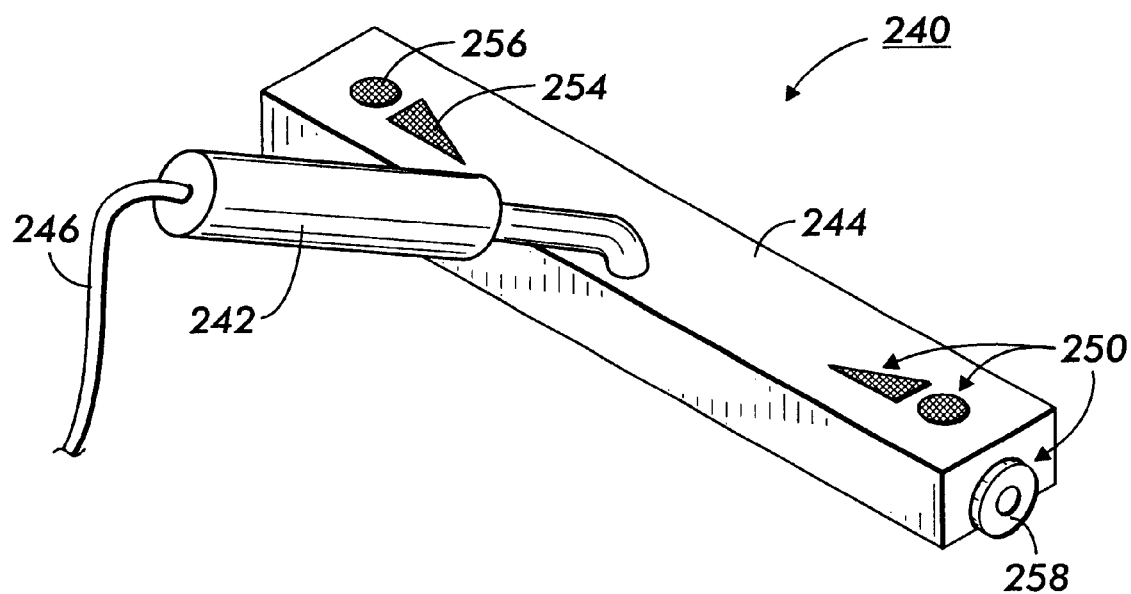
FIG. 3 is a perspective view of a first exemplary embodiment of a marking mechanism and a part of a position sensing system according to this invention.
Figure 4:
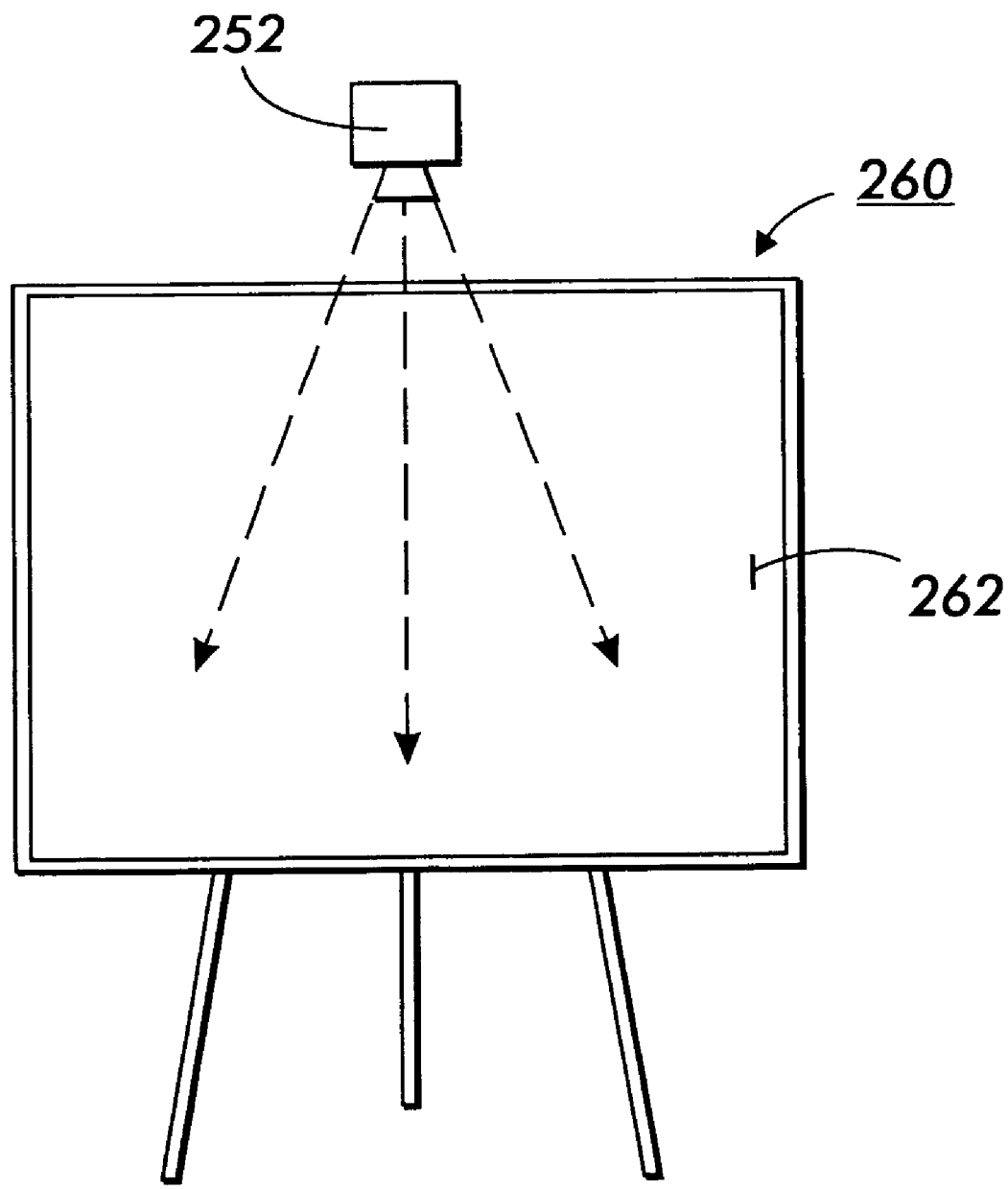
FIG. 4 is schematic representation of another part of the position sensing system according to the first embodiment of FIG. 3.

FIGS. 3 and 4 show a first exemplary embodiment of a marking mechanism 240 and a position sensing system 250, corresponding to the marking mechanism 140 and the position sensing system 150. As shown in FIG. 3, the marking mechanism 240 comprises a hand-held device that resembles a squeegee. The marking mechanism 240 includes a handle portion 242 and a print head portion 244. The handle portion 242 facilitates movement of the marking mechanism 240 across a whiteboard 260, shown in FIG. 4, while keeping the print head portion 244 adjacent to a surface 262 of the whiteboard 260.

The print head portion 244 includes a linear array of ink nozzles (not shown) that are capable of ejecting a dry-erase ink onto the surface 262 of the whiteboard 260. As noted above, ink-jet print head technology may be modified to meet the particular requirements of the dry-erase ink used and the resolution desired.

As shown in FIG. 3, a tether 246 is connected to the handle portion 242 of the marking mechanism 240. The tether 246 may comprise a wired link, as part of the communication system 130, that carries electronic signals to and/or from the marking mechanism 240. The tether 246 also may comprise a wire that carries power to the print head portion 244 of the marking mechanism 240. In various embodiments, the tether 246 also may comprise a flexible tube that carries ink to the print head portion 244.

As noted above, a wireless link may be used instead of the tether 246 to transmit electronic signals to and/or from the marking mechanism 240. Such a wireless link may employ radio frequency or infrared technology. For example, infrared receivers and/or transmitters may be located on the marking mechanism 240. The communication system 130 accordingly may comprise an infrared communication station, for example, mounted on the whiteboard 260.

In the exemplary embodiment shown in FIGS. 3 and 4, the position sensing system 250 is based on computer vision technology. This technology basically involves locating and tracking.

As shown in FIG. 4, a color video camera 252 is positioned to view the whiteboard 260 and objects adjacent the surface 262. For example, the camera 252 may be mounted above the whiteboard 260 and suspended from the ceiling. The camera 252 is calibrated such that locations expressed in the coordinate system of the camera image can be translated to the coordinate system of the whiteboard 260 using well-known mathematics of projective geometry.

As shown in FIG. 3, in various exemplary embodiments, the print head portion 244 of the marking mechanism 240 can be colored or painted on a back surface, i.e., the surface facing away from the whiteboard 260, with a pattern of distinctively colored and/or patterned fiducial markings 254 and 256 unlikely to be found elsewhere on the whiteboard, such as, for example, a lime green triangle 254 and a fluorescent pink circle 256. The distinctive markings 254 and 256 facilitate very fast locating and tracking of the marking mechanism 240 within the field of vision of the camera 252 using one or more segmentation techniques that are wellknown in the art.

In one exemplary embodiment of a color-based segmentation technique, all pixels of the camera image that do not fall within the extreme range of the color space representing the distinctively colored markings 254 and 256 on the marking mechanism 240 are set to black. The remaining "ON" pixels, those not set to black, are clustered. The centroid and first moment of inertia are used to determine a location and orientation estimate of the print head portion 244 of the marking mechanism 240 within the camera image. Finally, a search algorithm is used to find the known elements of the colored pattern, the brightly colored markings 254 and 256, and to fit these known elements to a geometric model reflecting their known arrangement on the print head portion 244 of the marking mechanism 240.

Once the print head portion 244 has been located, fast tracking is performed by searching the incoming video stream of the camera 252 for the fiducial markings 254 and 256 in a small region of the captured image predicted based on the last known position and determined motion of the marking mechanism 240. Such fast tracking of known patterns has been demonstrated by Hager et al. For example, see *The XVision System: A General-Purpose Substrate for Portable Real-Time Vision Applications*, Computer Vision and Image Understanding 69(1) pp. 23–37. The well-known method of Kalman filters may be used to estimate both the position and velocity of the moving marking mechanism 240.

In addition to this vision-based method, a mechanical technique may be used to augment the image-based information about the position of the marking mechanism 240. For example, as shown in FIG. 3, one or more wheels 258 may be mounted on the print head portion 244 of the marking mechanism 240. A pair of wheels 258 may be mounted at opposite ends of the print head portion 244. The print head portion 244 is supported on the wheels 258 in contact with the surface 262 of the whiteboard 260. The wheels 258 turn as the marking mechanism 240 moves across the whiteboard 260 and maintain a desired height of the print nozzles (not shown) above the surface 262 of the whiteboard 260.

The wheels 258 may be instrumented with suitable rotary encoders capable of measuring the rotation of the wheels 258 with great precision. Since there may be a slight delay in the processing of image-based information by the camera 252 and delivery to the control mechanism, rotation information from the rotary encoders should help to improve the estimate of the instantaneous position of the marking mechanism 240 as it is swiped across the whiteboard 260.

Figure 5:
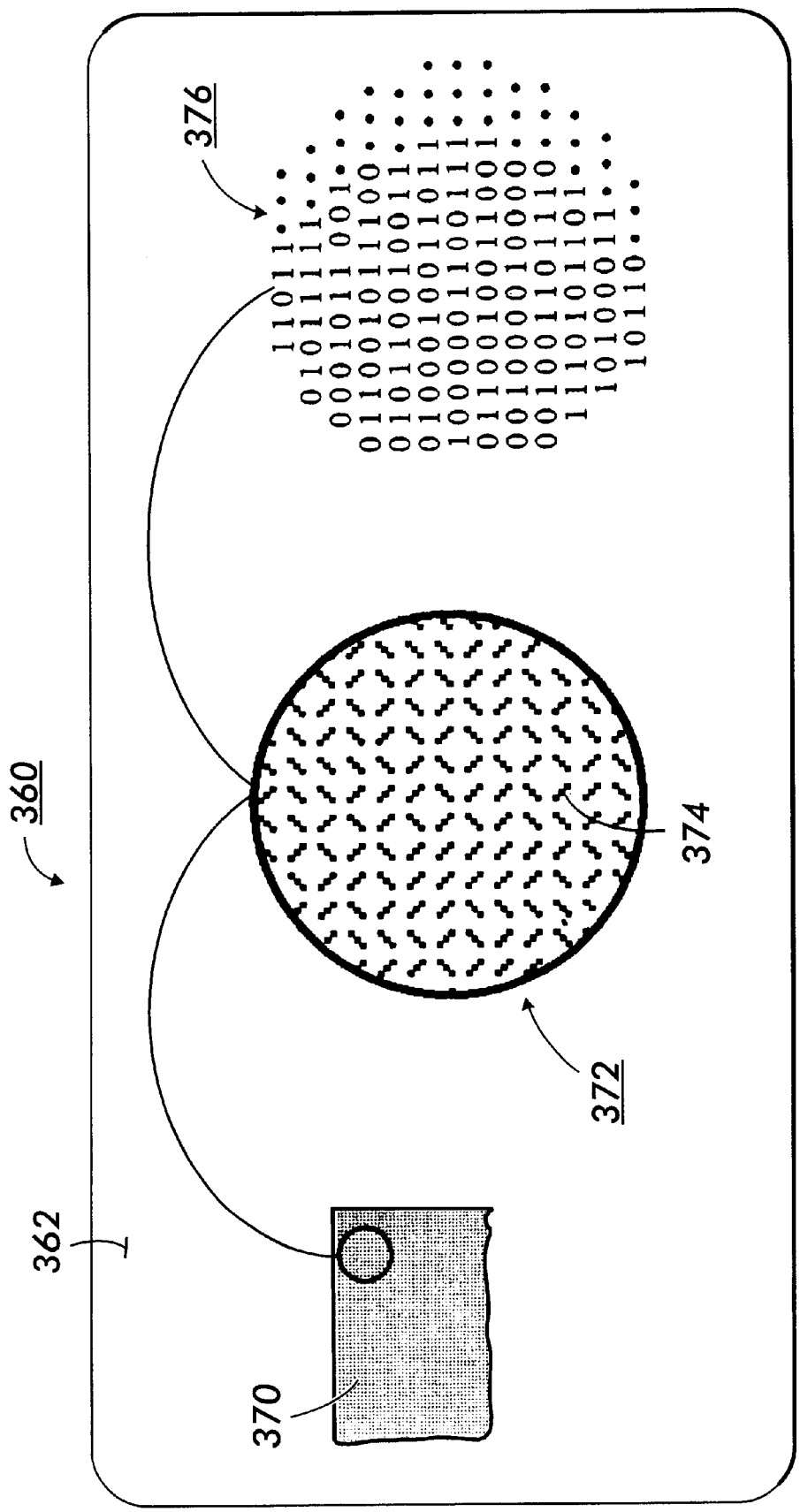
FIG. 5 is a plan view of a part of the position sensing system of a second exemplary embodiment of a marking mechanism and a part of a position sensing system according to this invention.
Figure 6:
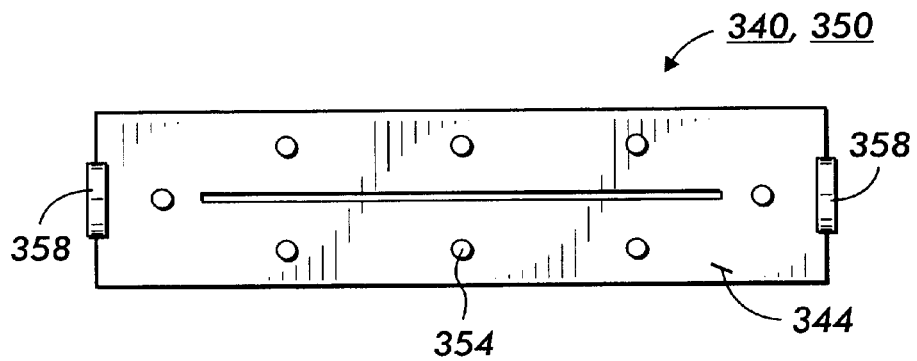
FIG. 6 is a partial bottom view of a marking mechanism and another part of the position sensing system according to the second embodiment of FIG. 5.

FIGS. 5 and 6 show a second exemplary embodiment of a marking mechanism 340 and a position sensing system 350, corresponding to the marking mechanism 140 and the position sensing system 150. As shown in FIG. 5, a surface 362 of a whiteboard 360 may be provided with glyph marks 370. The glyph marks 370 may be printed or otherwise applied to the surface 362 in such a way that they do not interfere with normal use of the whiteboard 360, including printing according to this invention. While the glyph marks 370 are shown as placed on only a portion of the surface 362, it should be understood that the glyph marks 370 may cover as much or as little of the whiteboard 360 as needed to provide accurate position information for the marking mechanism 340.

The glyph marks 370 encode global position information that may be embedded in a glyph pattern including data glyphs, such as described in U.S. Pat. No. 5,939,703 to Hecht et al., incorporated herein by reference in its entirety. As shown in a magnified portion 372, the glyph pattern may be represented by slash-like symbols 374. These symbols 374 provide a generally homogeneous, unobtrusive appearance when viewed by the unaided eye under normal viewing conditions. As shown in the representation 376 of the magnified portion 372, each symbol 374 may be read as a "1" or a "0" depending on its orientation.

As shown in FIG. 6, a front side, i.e., facing the whiteboard 360, of a print head portion 344 of the marking mechanism 340 includes a plurality of small video cameras 354 as part of the position sensing system 350. The marking mechanism 340 also may include one or more wheels 358 as described with respect to the first exemplary embodiment. Alternatively, the glyph marks 370 may themselves augment the global positioning information by also providing local position information.

The video cameras 354 image the symbols 374 of the glyph marks 370 as the marking mechanism 340 moves over the surface 362 of the whiteboard 360. A suitable controller (not shown) decodes or interprets the images of the video cameras 354 to determine the global position of the marking mechanism 340 relative to the whiteboard 360. The plurality of video cameras 354 allow the orientation of the marking mechanism 340 to be determined. Also, consecutive images may be used to provide additional information, such as direction and/or velocity, and/or local position information may be decoded from the glyph marks 370.

Figure 7:
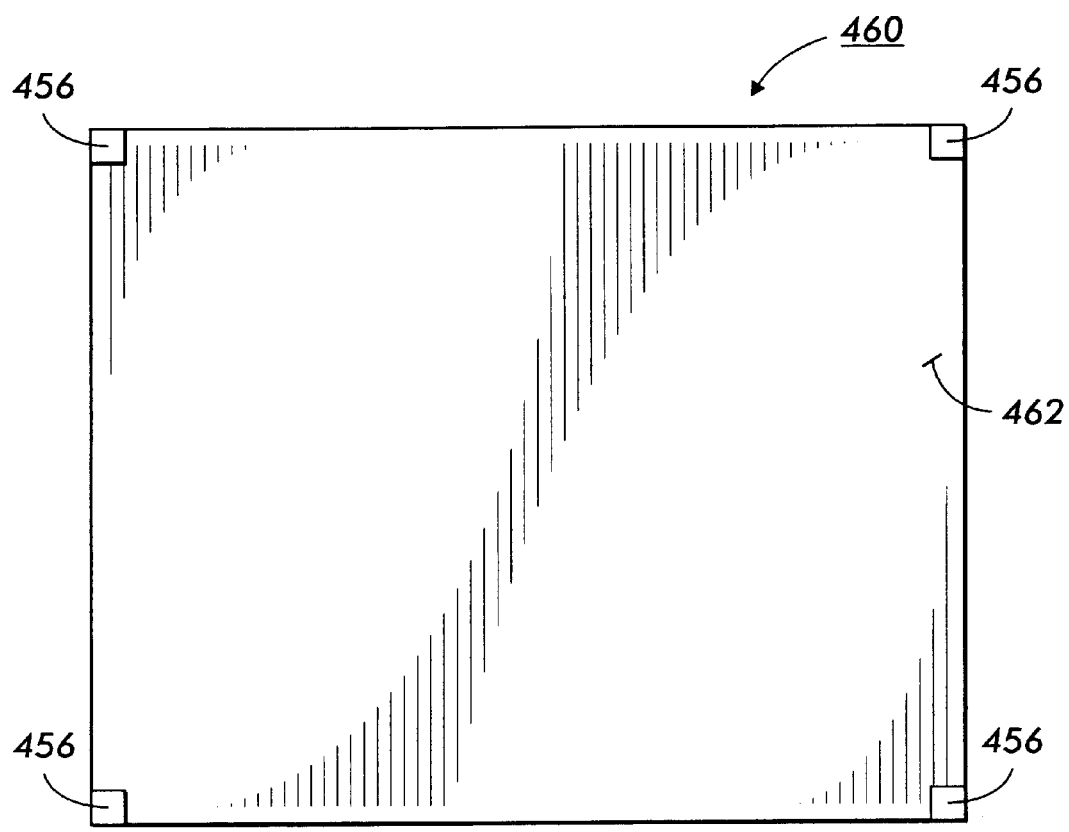
FIG. 7 is a perspective view of a third exemplary embodiment of a marking mechanism and a part of a position sensing system according to this invention.
Figure 8:
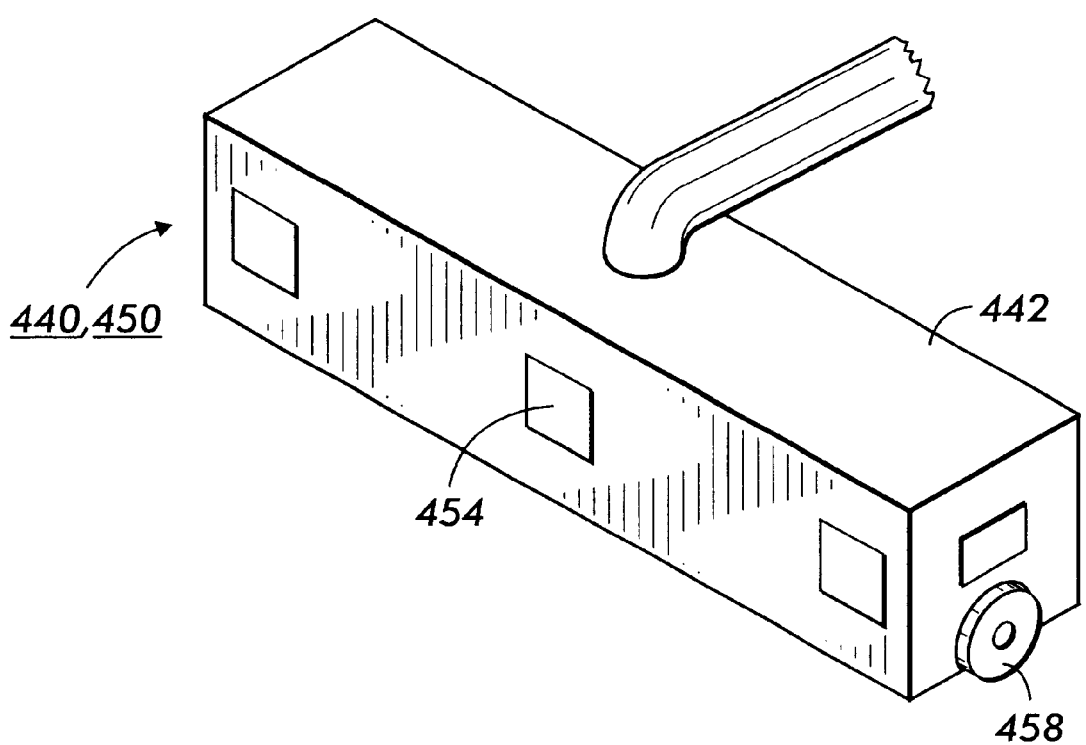
FIG. 8 is plan view of another part of the position sensing system according to the third embodiment of FIG. 7.

FIGS. 7 and 8 show a third exemplary embodiment of a marking mechanism 440 and a position sensing system 450, corresponding to the marking mechanism 140 and the position sensing system 150. As shown in FIG. 7, a plurality of ultrasound transducers 456 are provided on a whiteboard 460. For example, four transducers 456 may be used, one in each corner of the whiteboard 460. A print head portion 442 of the marking mechanism 440 includes at least one ultrasound transmitter 454. The transmitter(s) 454 and transducers 456 triangulate the position of the marking mechanism 440 on the whiteboard 460. Any suitable combination of transmitter and transducers, either known or hereafter developed, and any suitable arrangement combination of the transmitter and the transducers, may be used. The details of the operation and construction such an ultrasound position device are known, for example, as discussed in U.S. Pat. No. 4,814,552 to Stefik et al., incorporated herein by reference in its entirety. Again, the marking mechanism 440 also may include one or more wheels 458 as described with respect to the first exemplary embodiment.

This invention also contemplates using optical scanning technology with laser position sensors, such as discussed in U.S. Pat. No. 5,585,605 to Williams et al., incorporated herein by reference in its entirety.

The control mechanism 120 uses the position information from the position sensing system 150 to determine which nozzles of the marking mechanism 140 to actuate. For example, given 2-D coordinates (x, y, θ) of the print head portion of the marking mechanism 140 on the whiteboard as the marking mechanism 140 moves, the control mechanism 120 looks up the colors of the pixel desired to be printed under each ink nozzle at a suitable time step or frequency, referring to the image data of the stored image. Since there may be a slight delay from the time pixel colors are looked up to the time they are printed, it may be necessary to "look ahead" and index pixels of the image data slightly ahead of the current location of each ink nozzle using the motion of the marking mechanism 140 as determined by the position sensing system 150. The parameters of the look-ahead are determined by the actual performance of the whiteboard printer system 100 that is implemented.

The whiteboard printer system 100 described above might be used in conjunction with a whiteboard image capture device in certain applications. For example, a user of the whiteboard printer system 100 may prepare for a meeting by preparing a detailed agenda in a text editor and recalling an engineering drawing from a CAD tool before the meeting starts. The user prints the agenda and drawing on the whiteboard in the meeting room using the using the whiteboard printer system 100. During the meeting, the printed agenda may be modified by crossing out items, erasing items, and printing additional items, using conventional whiteboard eraser and markers. The engineering drawing may be similarly modified. At the end of the meeting, the whiteboard may be scanned with a camera-based whiteboard scanner or other whiteboard image capture device. The image of the modified meeting agenda may then be emailed to all participants for their records. The marked-up engineering drawing may be printed out and used for reference by a drafter who updates the CAD drawing.

An additional example illustrates further possible application of the whiteboard printer system 100 for interactive editing of a whiteboard's contents on a several-minute time scale. The initial agenda may be modified, for example, using proofreader markup symbols. Then, the image of the agenda is scanned and the proofreader markings are interpreted by image understanding software to generate a new, modified agenda image. The updated agenda image may then be printed onto the whiteboard using the whiteboard printer system 100. In general, a diagrammatic user interface could be used to incrementally modify whiteboard images on a several-minute time scale, to permit functions such as: moving and scaling items on the whiteboard; rearranging list items; editing engineering drawings and schematics; removing ink of certain colors (e.g., text in black and annotations in red such that the annotations may be removed). The ability to print ink on a whiteboard opens a host of new uses for whiteboards in integration with electronic documents and electronic document services.

While this invention has been described in conjunction with various exemplary embodiments, it is to be understood that many alternatives, modifications and variations would be apparent to those skilled in the art. Accordingly, Applicants intend to embrace all such alternatives, modifications and variations that follow in the spirit and scope of this invention. In particular, while the exemplary embodiments described above involve a whiteboard, it is to be understood that the systems and methods of this invention may be used with any suitable surface or medium.

What is claimed is:

1. A hand-held printer system, comprising:
   a marking mechanism including at least one print head,
   a global position sensing system that senses a position of the at least one print head relative to a printing surface or medium in a global coordinate system; and
   a control mechanism that actuates the at least one print head based on the sensed position.

2. The system of claim 1, wherein the at least one print head is an ink jet print head including at least one array of ink jet nozzles.

3. The system of claim 2, further comprising a dry-erase ink supply in fluid communication with the at least one ink jet print head.

4. The system of claim 1, wherein the global position sensing system comprises a video-based system.

5. The system of claim 4, wherein the video-based system includes a plurality of glyph marks on a printing surface and at least one video camera associated with the at least one print head, the video camera arranged to sense at least one of the plurality of glyph marks to provide global position information of the at least one print head.

6. The system of claim 5, wherein the plurality of glyph marks include both global and local position information.

7. The system of claim 4, further comprising at least one colored object associated with the marking mechanism, wherein the video-based system includes a color video camera and a video data processor, the color video camera arranged to sense a printing surface and the at least one object associated with the marking mechanism.

8. The system of claim 7, wherein the position sensing system further comprises at least one sensor associated with the at least one print head that measures an amount of movement of the at least one print head along the printing surface.

9. The system of claim 8, wherein the at least one sensor comprises:
   at least one wheel supporting the at least one print head on the printing surface; and
   at least one encoder that senses rotation of the at least one wheel.

10. The system of claim 9, wherein the at least one wheel supports the at least one print head at a pre-determined distance from the printing surface.

11. The system of claim 1, wherein the global position sensing system comprises at least one laser scanner position sensor.

12. The system of claim 1, wherein the global position sensing system comprises an ultrasound-based system.

13. The system of claim 12, wherein the ultrasound-based system comprises:
   at least one ultrasound transducer associated with the marking mechanism; and
   a plurality of ultrasound transducers associated with a drawing surface.

14. The system of claim 1, wherein the control mechanism comprises:
   an input/output interface that receives position data from the global position sensing system;
   a data storage device that stores a source image having pixel data; and
   a controller that accesses the pixel data of the stored source image based on the received position data and generates an actuation signal based on the accessed pixel data, the generated actuation signal sent to the at least one print head by the input/output interface.

15. The system of claim 1, further comprising a communication system that supplies a signal to the control mechanism to actuate the at least one print head.

16. The system of claim 15, wherein the communication system comprises at least one wire connecting the control mechanism to the marking mechanism.

17. The system of claim 15, wherein the communication system comprises:
   a first transmitter and a first receiver associated with the marking mechanism; and
   a second transmitter and a second receiver associated with the control mechanism.

18. The system of claim 17, wherein the first and second transmitters and receivers are infrared transmitters and receivers.

19. The system of claim 17, wherein the first and second transmitters and receivers are radio frequency transmitters and receivers.

20. A method for marking on a surface using a hand-held printer, comprising:
   moving a marking mechanism over a surface;
   sensing a position of the marking mechanism relative to the surface in a global coordinate system; and
   actuating the marking mechanism to create a mark on the surface based on the sensed position.

21. The method of claim 20, further comprising sending a control signal to the marking mechanism based on the sensed position, the control signal actuating the marking mechanism.

22. The method of claim 20, further comprising generating an image data signal based on the sensed position of the marking mechanism, wherein the marking mechanism is actuated according to the image data signal.

23. The method of claim 20, wherein sensing the position of the marking mechanism is sensed using a video-based system.

24. The method of claim 20, wherein sensing the position of the marking mechanism comprises using a color video camera and a video data processor.

25. The method of claim 20, wherein sensing the position of the marking mechanism comprises using a laser scanner position sensor.

26. The method of claim 20, wherein sensing the position of the marking mechanism comprises using an ultrasound-based system.

27. The method of claim 20, wherein sensing the position of the marking mechanism comprises using a plurality of glyph marks.

28. The system of claim 7, wherein the video data processor performs a color-based segmentation technique.

29. The method of claim 24, wherein using the video data processor comprises performing a color-based segmentation technique.

* * * * *